United States Patent
Lai et al.

(10) Patent No.: US 11,631,858 B2
(45) Date of Patent: Apr. 18, 2023

(54) POSITIVE ELECTRODE MATERIAL, POSITIVE ELECTRODE AND BATTERY EMPLOYING THE SAME

(71) Applicant: INDUSTRIAL TECHNOLOGY RESEARCH INSTITUTE, Hsinchu (TW)

(72) Inventors: Guan-Lin Lai, Qionglin Township (TW); Chen-Chung Chen, Taoyuan (TW); Yu-Han Li, New Taipei (TW); Jung-Mu Hsu, Magong (TW)

(73) Assignee: INDUSTRIAL TECHNOLOGY RESEARCH INSTITUTE, Chutung (TW)

( * ) Notice: Subject to any disclaimer, the term of this patent is extended or adjusted under 35 U.S.C. 154(b) by 173 days.

(21) Appl. No.: 17/116,648

(22) Filed: Dec. 9, 2020

(65) Prior Publication Data
US 2021/0175509 A1 Jun. 10, 2021

Related U.S. Application Data

(60) Provisional application No. 62/945,425, filed on Dec. 9, 2019.

(51) Int. Cl.
*H01M 4/00* (2006.01)
*H01M 4/62* (2006.01)
(Continued)

(52) U.S. Cl.
CPC .......... *H01M 4/628* (2013.01); *H01M 4/131* (2013.01); *H01M 4/366* (2013.01); *H01M 4/505* (2013.01);
(Continued)

(58) Field of Classification Search
CPC ......... H01M 4/5825; H01M 2004/028; H01M 4/505; H01M 4/625; Y02E 60/10
See application file for complete search history.

(56) References Cited

U.S. PATENT DOCUMENTS 10,461,323 B2 * 10/2019 Burshtain ............. H01M 4/134
2013/0149587 A1 6/2013 Yu et al.
(Continued)

FOREIGN PATENT DOCUMENTS

CN 103633329 A 3/2014
CN 103855379 A 6/2014
(Continued)

OTHER PUBLICATIONS

Taiwanese Office Action and Search Report for Taiwanese Application No. 109143488, dated Sep. 6, 2021.
(Continued)

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

A positive electrode material, a positive electrode, and a battery employing the same are provided. The positive electrode material includes an active particle and a modified layer covering the surface of the active particle. The modified layer is a reaction product of a composition. The composition includes an ionic conductive ceramic compound, an organic conductive compound, and a coupling agent. In the disclosure, the ionic conductive ceramic compound is 50-84 parts by weight, the organic conductive compound is 16-50 parts by weight, and the total weight of the ionic conductive ceramic compound and the organic conductive compound is 100 parts by weight. In the disclosure, the weight percentage of the coupling agent is from
(Continued)

0.05 wt % to 10 wt %, based on the total weight of the ionic conductive ceramic compound and the organic conductive compound.

19 Claims, 2 Drawing Sheets

(51) Int. Cl.
    *H01M 4/36*     (2006.01)
    *H01M 4/505*     (2010.01)
    *H01M 4/525*     (2010.01)
    *H01M 4/131*     (2010.01)
    *H01M 10/0525*     (2010.01)
    *H01M 4/02*     (2006.01)

(52) U.S. Cl.
    CPC ........... *H01M 4/525* (2013.01); *H01M 4/625* (2013.01); *H01M 10/0525* (2013.01); *H01M 2004/028* (2013.01); *H01M 2300/0037* (2013.01)

(56) References Cited

U.S. PATENT DOCUMENTS

| | | | |
|---|---|---|---|
| 2014/0120402 A1 | 5/2014 | Yu et al. | |
| 2014/0342229 A1* | 11/2014 | Kwak | H01M 4/587 |
| | | | 429/231.95 |
| 2015/0079485 A1 | 3/2015 | Choi et al. | |
| 2015/0349336 A1* | 12/2015 | Yokoyama | H01M 4/505 |
| | | | 429/223 |
| 2016/0226051 A1 | 8/2016 | Lee et al. | |
| 2016/0322685 A1 | 11/2016 | Choi | |
| 2017/0187076 A1 | 6/2017 | Li et al. | |
| 2018/0145296 A1 | 5/2018 | Choi et al. | |
| 2018/0145297 A1 | 5/2018 | Choi et al. | |
| 2018/0351202 A1 | 12/2018 | Choi et al. | |
| 2019/0123384 A1 | 4/2019 | Harry et al. | |
| 2019/0165376 A1 | 5/2019 | Yuen et al. | |

FOREIGN PATENT DOCUMENTS

| | | |
|---|---|---|
| CN | 104201320 A | 12/2014 |
| CN | 105070888 A | 11/2015 |
| CN | 106558665 A | 4/2017 |
| CN | 107706377 A | 2/2018 |
| CN | 109148860 A | 1/2019 |
| JP | 2007-242303 A | 9/2007 |
| JP | 2014-175278 A | 9/2014 |
| JP | 2016-146322 A | 8/2016 |
| JP | 2017-117792 A | 6/2017 |

OTHER PUBLICATIONS

Japanese Office Action for Japanese Application No. 2020-204259, dated Dec. 1, 2021, with English translation.

* cited by examiner

POSITIVE ELECTRODE MATERIAL, POSITIVE ELECTRODE AND BATTERY EMPLOYING THE SAME

CROSS REFERENCE TO RELATED APPLICATIONS

This application claims the benefit of U.S. Provisional Application No. 62/945,425, filed on Dec. 9, 2019, which is hereby incorporated herein by reference.

TECHNICAL FIELD

The disclosure relates to a positive electrode material, a positive electrode, and a battery employing the same.

BACKGROUND

In conventional liquid electrolyte lithium-ion batteries, the energy storage cost per unit is high due to the low gravimetric energy density and the limited life cycle. In order to further improve the safety of downstream applications, the goal has been the development of a solid-state battery that employs a solid-state electrolyte as a replacement for the conventional liquid-state electrolyte.

In the development of such a solid-state battery, high interphase resistance between the electrode and the solid-state electrolyte has become a problem. The use of lithium-containing oxide modified with inorganic ceramic conductor is regarded as one of the solutions for the high ionic conductivity of inorganic ceramic conductors. However, cracks can easily occur between an inorganic ceramic conductor and lithium-containing oxide, thereby reducing the cycle performance and high-rate discharge ability.

Therefore, what is needed is a novel design and a structure for a battery that solves the aforementioned problems, prolongs the lifetime, and improves the battery's performance.

SUMMARY

According to embodiments of the disclosure, the disclosure provides a positive electrode material used in a positive electrode of a battery, such as the positive electrode of lithium-ion battery. The positive electrode material can include an active particle, and a modified layer covering or encapsulating the active particle. According to embodiments of the disclosure, the modified layer can be a reaction product of a composition, wherein the composition can include an ionic conductive ceramic compound, an organic conductive compound, and a coupling agent. According to embodiments of the disclosure, the ionic conductive ceramic compound is 50 to 84 parts by weight, the organic conductive compound is 16 to 50 parts by weight, and the total weight of the ionic conductive ceramic compound and the organic conductive compound is 100 parts by weight. According to embodiments of the disclosure, the coupling agent is from 0.05 wt % to 10 wt %, based on the total weight of the ionic conductive ceramic compound and the organic conductive compound.

According to some embodiments of the disclosure, the disclosure provides a positive electrode, such as the positive electrode of lithium-ion battery. The positive electrode can include a positive electrode current-collecting layer, and a positive electrode active layer, wherein the positive electrode active layer can be disposed on the positive electrode current-collecting layer. The positive electrode active layer can include the positive electrode material of the disclosure, a conductive additive, and a binder.

According to some embodiments of the disclosure, the disclosure provides a battery, such as lithium-ion battery. The battery can include the positive electrode of the disclosure, a separator, and a negative electrode, wherein the negative electrode is separated from the positive electrode by the separator.

A detailed description is given in the following embodiments with reference to the accompanying drawings.

DETAILED DESCRIPTION

Figure 1:
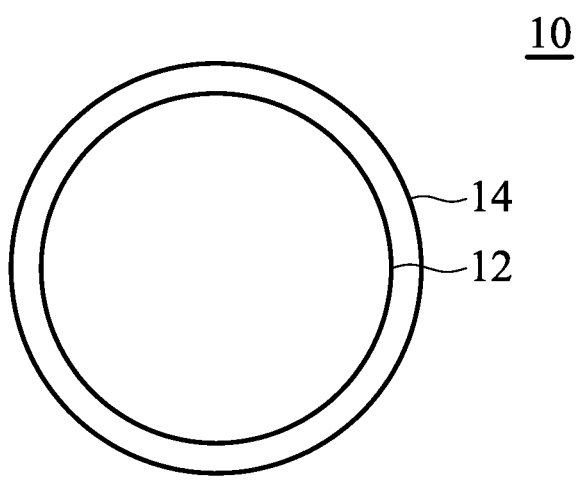
FIG. 1 is a cross-sectional view of the positive electrode material according to an embodiment of the disclosure.

The positive electrode material, the positive electrode and the battery employing the same of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

The disclosure provides a positive electrode material used in a positive electrode of a battery, such as a positive electrode of a lithium-ion battery. The positive electrode material of the disclosure includes an active particle, and a modified layer covering the surface of the active particle. The modified layer is an organic/inorganic composite material, wherein the organic/inorganic composite material is prepared by combining an organic conductive compound with an ionic conductive ceramic compound via a coupling agent. In some embodiments, the modified layer encapsulates the active particle. In comparison with the positive electrode material which employs the modified layer consisting of the inorganic material, crack propagation in the modified layer is inhibited due to the components (constituted by the organic/inorganic composite material) design of the positive electrode material of the disclosure. In addition, since the modified layer constituted by the organic/inorganic composite material can form a stable solid electrolyte interface (SEI), the positive electrode material exhibits ion conductivity and electron conductivity simultaneously, thereby reducing the interphase resistance and enhancing the high C-rate discharge ability. Furthermore, the exothermal heat amount of the active particle, which contains high nickel content, can be reduced and safety in use of the lithium-ion battery can be further improved.

The positive electrode material of the disclosure, a conductive additive, and a binder can be dispersed in a solvent, forming a positive electrode slurry. The positive electrode slurry can be coated on a positive electrode current-collecting layer and then baked to form a positive electrode. The positive electrode of the disclosure is suitable to serve as the positive electrode of a battery (such as a lithium-ion battery). The lithium-ion battery employing the positive electrode of the disclosure is safer, has higher discharge ability at high C-rate, and has longer lifetime.

According to embodiments of the disclosure, the disclosure provides a positive electrode material for forming a positive electrode of a battery, such as a positive electrode of a lithium-ion battery. As shown in FIG. 1, the positive electrode material 10 can include an active particle 12 and a modified layer 14 covering or encapsulating the active particle 12. According to embodiments of the disclosure, the modified layer can be a reaction product of a composition. According to embodiments of the disclosure, the composition can include an ionic conductive ceramic compound, an organic conductive compound, and a coupling agent. According to embodiments of the disclosure, the ionic conductive ceramic compound can be 50 to 84 parts by weight (such as 55 parts by weight, 60 parts by weight, 65 parts by weight, 70 parts by weight, 75 parts by weight, or 80 parts by weight), the organic conductive compound can be 16 to 50 parts by weight (such as 20 parts by weight, 25 parts by weight, 30 parts by weight, 35 parts by weight, 40 parts by weight or 45 parts by weight), and the total weight of the ionic conductive ceramic compound and the organic conductive compound is 100 parts by weight. According to embodiments of the disclosure, the coupling agent can be 0.05 wt % to 10 wt % (such as 0.1 wt %, 0.2 wt %, 0.5 wt %, 1 wt %, 2 wt %, 3 wt %, 4 wt %, 5 wt %, 6 wt %, 7 wt %, 8 wt %, or 9 wt %), based on the total weight of the ionic conductive ceramic compound and the organic conductive compound.

According to embodiments of the disclosure, in the modified layer, the weight ratio of the ionic conductive ceramic compound to the organic conductive compound (or a compound derivative from the organic conductive compound) depends on the weight ratio of the ionic conductive ceramic compound to the organic conductive compound in the composition. According to embodiments of the disclosure, the weight ratio of the ionic conductive ceramic compound to the organic conductive compound (or a compound derivative from the organic conductive compound) in the modified layer is from about 5:1 to 3:2, such as about 4:1, about 3:1, or 2:1. If the amount of the ionic conductive ceramic compound in the modified layer is too high, the performance of the battery would be deteriorated (i.e. reducing the capacity and energy density based on weight). If the amount of the ionic conductive ceramic compound in the modified layer is too low, the performance of the battery would be deteriorated due to the poor ionic conductivity.

According to embodiments of the disclosure, due to the addition of organic conductive compound in the composition, the network structure of the organic conductive compound can encapsulate the ionic conductive ceramic compound via the coupling agent, thereby avoiding the formation of cracks in the modified layer. As a result, the ionic conductive ceramic compound would not be peeled from the active particle. In addition, the modified layer constituted by the organic/inorganic composite material can form a stable solid electrolyte interface (SEI) on the active particle surface. As a result, the positive electrode material exhibits ion conductivity and electron conductivity simultaneously thereby reducing the interphase resistance and enhancing the high-rate discharge ability. Furthermore, the exothermal heat amount of the active particle, which contains high nickel content, can be reduced, and safety in use of the lithium-ion battery can be further improved.

According to embodiments of the disclosure, the ionic conductive ceramic compound can be a doped or undoped titanium-containing phosphate, wherein the titanium-containing phosphate has a structure of Formula (I):

$$Li_xM_yTi_z(PO_4)_t \qquad \text{Formula (I)}$$

wherein M can be Al, Fe, or Cr; $0.15 \leq x \leq 53$; $0.1 \leq y \leq 53$; $15 \leq z \leq 53$; and, $15 \leq t \leq 53$. For example, x can be 0.2, 0.3, 0.4, 0.5, 0.6, 0.7, 0.8, 0.9, 1, 1.5, 2, 2.5, or 3; y can be 0.4, 0.8, 1, 1.2, 1.4, 1.5, 1.6, 1.7, 2, 2.5, or 3; z can be 1, 1.2, 1.4, 1.5, 1.6, 1.7, 2, 2.5, or 3; and t can be 1, 1.2, 1.4, 1.5, 1.6, 1.7, 2, 2.5, 2.9, or 3. For example, M is Al, x is 2, y is 1, z is 1, and t is 3. For example, M is Fe, x is 1.5, y is 0.8, z is 1.2, t is 2.9. For example, M is Cr, x is 2, y is 1.2, z is 2, t is 3.

According to embodiments of the disclosure, when the ionic conductive ceramic compound is doped titanium-containing phosphate and M is Al or Fe, the doped titanium-containing phosphate is doped with an element and the element is Cr, Zr, Sn, Ge, S, or a combination thereof. According to embodiments of the disclosure, when the ionic conductive ceramic compound is doped titanium-containing phosphate and M is Cr, the doped titanium-containing phosphate is doped with an element and the element is Zr, Sn, Ge, S, or a combination thereof. According to embodiments of the disclosure, the dose of the doped element can be $1 \times 10^{-9}$ atom % to 1 atom %, based on the total atomic amount of the titanium-containing phosphate. For example, when M is Al, the doped element is Cr and S, wherein the dose of Cr is 0.0024 atom %, and the dose of S is 0.005 atom %.

According to embodiments of the disclosure, the titanium-containing phosphate can be lithium-titanium-containing phosphate, such as lithium aluminum titanium phosphate, lithium iron titanium phosphate, or lithium chromium titanium phosphate. According to embodiments of the disclosure, the lithium-titanium-containing phosphate can be doped lithium aluminum titanium phosphate, or doped lithium iron titanium phosphate, wherein the doped element can be Cr, Zr, Sn, Ge, S, or a combination thereof. According to embodiments of the disclosure, the lithium-titanium-containing phosphate can be doped lithium chromium titanium phosphate, wherein the doped element can be Zr, Sn, Ge, S, or a combination thereof.

According to embodiments of the disclosure, the organic conductive compound can be a compound having aniline moiety, a compound having pyrrole moiety, a compound having maleimide moiety, or a compound having imino moiety.

According to embodiments of the disclosure, the organic conductive compound of the disclosure can be polymer, such as polyaniline, polyacetylene, polyphenylvinylene, poly-p-phenylene, polypyrrole, polythiophene, polyimide, maleimide compound, or a combination thereof. The polymer can have a weight average molecular weight from about 10,000 to 1,000,000, such as about 30,000 to 1,000,000, 30,000 to 900,000, 50,000 to 800,000, 80,000 to 750,000, or 100,000 to 600,000. The polymer can have a polymer dispersity index (PDI) from about 1.3 to 3.0, such as 1.5, 1.7, 1.9, 2.1, 2.3, 2.5, 2.7, or 2.9.

According to embodiments of the disclosure, the organic conductive compound can be maleimide compound, wherein the maleimide compound can be maleimide, bis-maleimide, or a combination thereof. According to embodiments of the disclosure, the maleimide can have a structure represented by Formula (II) or Formula (III)

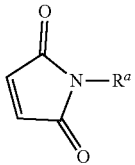

Formula (II)

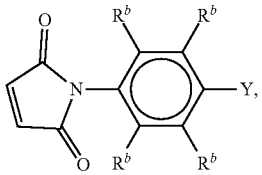

Formula (III)

wherein $R^a$ is $C_{1-8}$ alkyl group, —RNH$_2$, —C(O)CH$_3$, —CH$_2$OCH$_3$, —CH$_2$S(O)CH$_3$, —C$_6$H$_5$, —CH$_2$(C$_6$H$_5$)CH$_3$, phenylene, diphenylene, cycloaliphatics, or silane-substituted aromatics; Y is H, $C_{1-8}$ alkyl group, —S(O)—R$^c$, —CONH$_2$, or —C(CF$_3$)$_3$; $R^b$ is independently H, F, Cl, Br, HSO$_3$, SO$_2$, or $C_{1-8}$ alkyl group; R is $C_{1-8}$ alkylene group; and, $R^c$ is $C_{1-8}$ alkyl group.

According to embodiments of the disclosure, $C_{1-8}$ alkyl group can be linear or branched alkyl group. For example, $C_{1-8}$ alkyl group can be methyl, ethyl, propyl, butyl, pentyl, hexyl, heptyl, octyl, or an isomer thereof. According to embodiments of the disclosure, $C_{1-8}$ alkylene group can be linear or branched alkylene group. For example, $C_{1-8}$ alkylene group can be methylene, ethylene, propylene, butylene, pentylene, hexylene, heptylene, octylene, or an isomer thereof.

According to embodiments of the disclosure, the maleimide can be maleimide-phenylmethane, phenyl-maleimide, methylphenyl maleimide, dimethylphenyl-maleimide, ethylenemaleimide, thio-maleimid, ketone-maleimid, methylene-maleinimid, maleinimidomethylether, maleimidoethandiol, 4-phenylether-maleimid, 4, maleimidophenylsulfone, or a combination thereof.

According to embodiments of the disclosure, the bismaleimide can have a structure represented by Formula (IV) or (V):

Formula (IV)

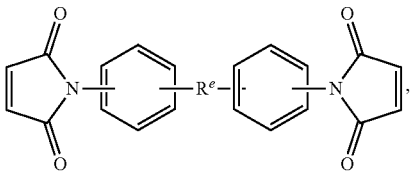

Formula (V)

wherein $R^d$ is $C_{1-8}$ alkylene group, —RNHR—, —C(O)CH$_2$—, —CH$_2$OCH$_2$—, —C(O)—, —O—, —O—O—, —S—, —S—S—, —S(O)—, —CH$_2$S(O)CH$_2$—, —(O)S(O)—, —C$_6$H$_5$—, —CH$_2$(C$_6$H$_5$)CH$_2$—, —CH$_2$(C$_6$H$_5$)(O)—, phenylene, diphenylene, substituted phenylene, or substituted diphenylene; $R^e$ is $C_{1-8}$ alkylene group, —C(O)—, —C(CH$_3$)$_2$—, —O—, —O—O—, —S—, —S—S—, —(O)S(O)—, or —S(O)—; and, R is $C_{1-8}$ alkylene group.

According to embodiments of the disclosure, the bismaleimide can be N,N'-bismaleimide-4,4'-diphenylmethane, [1,1'-(methylenedi-4,1-phenylene)bismaleimide], [N,N'-(1,1'-biphenyl-4,4'-diyl)bismaleimide], [N,N'-(4-methyl-1,3-phenylene)bismaleimide], [1,1'-(3,3'dimethyl-1,1'-biphenyl-4,4'-diyl)bismaleimide], N,N'-ethylenedimaleimide, [N,N'-(1,2-phenylene)dimaleimide], [N,N'-(1,3-phenylene) dimaleimide], N,N'-thiodimaleimide, N,N'-dithiodimaleimide, N,N'-ketonedimaleimide, N,N'-methylene-bis-maleinimide, bis-maleinimidomethyl-ether, [1,2-bis-(maleimido)-1,2-ethandiol], N,N'-4,4'-diphenylether-bis-maleimid, [4, 4'-bis(maleimido)-diphenylsulfone], or a combination thereof.

According to embodiments of the disclosure, the coupling agent can include at least one of compounds having a structure of Formula (VI)

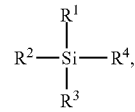

Formula (VI)

wherein $R^1$, $R^2$, $R^3$ and $R^4$ are independently —OH, —O, —OC$_n$H$_{2n+1}$, —C$_n$H$_{2n}$NH$_2$, —C$_n$H$_{2n}$SH, —C$_n$H$_{2n}$NCO, —C$_n$H$_{2n}$NHCONH$_2$, or —C$_n$H$_{2n}$OCOHCHR$^5$, and at least one of $R^1$, $R^2$, $R^3$ and $R^4$ is —C$_n$H$_{2n}$NH$_2$, —C$_n$H$_{2n}$SH, —C$_n$H$_{2n}$NCO, —C$_n$H$_{2n}$NHCONH$_2$, or —C$_n$H$_{2n}$OCOHCHR$^5$; n is an integer from 1-5; and, $R^5$ is independently hydrogen or methyl.

According to embodiments of the disclosure, the coupling agent can be the compound having the structure of Formula (VI). For example, the coupling agent can be 3-methacryloxypropyl trimethoxysilane, 3-methacryloxypropyl triethoxysilane, 3-aminopropyltrimethoxysilane, 3-aminopropyltriethoxysilane (ATPES), 3-mercaptopropyltrimethoxysilane (MPTMS), 3-mercaptopropyltriethoxysilane, 3-acryloxypropyl trimethoxysilane, 3-acryloxypropyl triethoxysilane, 3-Ureidopropyltriethoxysilane, 3-Isocyanatepropyltriethoxysilane, or a combination thereof.

According to embodiments of the disclosure, the active particle can be lithium-containing oxide. For example, the lithium-containing oxide can be lithium nickel cobalt aluminum oxide (NCA), lithium nickel cobalt manganese oxide (LNCM), lithium cobalt oxide, lithium manganese oxide, lithium nickel oxide, or a combination thereof.

According to embodiments of the disclosure, the particle size of the active particle can be from 1 m to 20 m. If the particle size of the active particle is too small, the active particle exhibits poor dispersibility. If the particle size of the active particle is too large, the active particle exhibits poor conductivity.

According to embodiments of the disclosure, the modified layer can be 0.1 wt % to 10 wt %, based on the total weight of the positive electrode material. Namely, the weight ratio of the modified layer to the total weight of the positive electrode material is about 0.001 to 0.1, such as about 0.002, 0.005, 0.01, 0.02, 0.05, or 0.08.

According to embodiments of the disclosure, the modified layer includes the organic conductive compound, and the organic conductive compound has a network structure. There are chemical bonds formed between the organic conductive compound and the ionic conductive ceramic compound due to the use of the coupling agent.

According to embodiments of the disclosure, the method for preparing the positive electrode material can include the following steps. First, the organic conductive compound and the coupling agent are dispersed or dissolved in a solvent, obtaining a first solution. The solvent, for example, can be N-methylpyrrolidone (NMP), N, N-dimethylformamide (DMF), N,N-dimethylacetamide (DMAc), pyrrolidone, N-dodecylpyrrolidone, γ-butyrolactone, or a combination thereof. The first solution can have a solid content from 1 wt % to 20 wt %, based on the total weight of the first solution. Next, the first solution is stirred at 25-90° C. for 10-120 minutes, and the ionic conductive ceramic compound is added into the solution, obtaining a mixture. Herein, the weight ratio of the ionic conductive ceramic compound to the organic conductive compound is from about 5:1 to 3:2, and the coupling agent can be 0.05 wt % to 10 wt % (based on the total weight of the ionic conductive ceramic compound and the organic conductive compound). Next, the mixture is heated at 50-100° C. for 60-240 minutes, obtaining a second solution. Next, the second solution is mixed with an active particle, and the mixture is stirred at 50-100° C. for 60-240 minutes. Next, the result is baked at 90-150° C. for 30-360 minutes, obtaining the positive electrode material of the disclosure.

Figure 2:
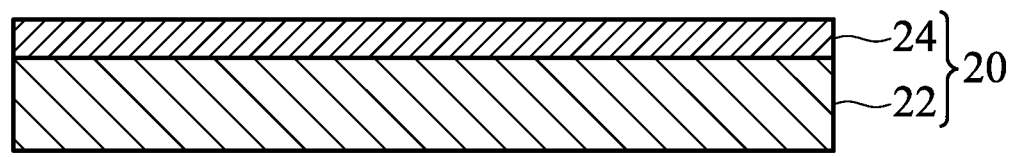
FIG. 2 is a cross-sectional view of the positive electrode used in the battery according to an embodiment of the disclosure.

According to embodiments of the disclosure, the disclosure also provides a positive electrode used in a battery (such as a lithium-ion battery). According to embodiments of the disclosure, as shown in FIG. 2, the positive electrode 20 includes a positive electrode current-collecting layer 22, and a positive electrode active layer 24 disposed on the positive electrode current-collecting layer 22. According to embodiments of the disclosure, the positive electrode active layer 24 includes the aforementioned positive electrode material, a conductive additive, and a binder.

According to embodiments of the disclosure, the positive electrode 20 of the disclosure used in a battery (such as a lithium-ion battery) can consist of the positive electrode current-collecting layer 22 and the positive electrode active layer 24.

According to embodiments of the disclosure, in the positive electrode active layer 24, the positive electrode material can have a weight percentage from about 96 wt % to 99.8 wt % (such as about 96.5 wt %, 97 wt %, 97.5 wt %, 98 wt %, 98.5 wt %, 99 wt %, or 99.5 wt %), the conductive additive can have a weight percentage from about 0.1 wt % to 2 wt % (such as about 0.2 wt %, 0.4 wt %, 0.6 wt %, 0.8 wt %, 1.0 wt %, 1.2 wt %, 1.4 wt %, 1.6 wt %, or 1.8 wt %), and the binder can have a weight percentage from about 0.1 wt % to 2 wt % (such as about 0.2 wt %, 0.4 wt %, 0.6 wt %, 0.8 wt %, 1.0 wt %, 1.2 wt %, 1.4 wt %, 1.6 wt %, or 1.8 wt %), based on the total weight of the positive electrode material, the conductive additive, and the binder. If the amount of the conductive additive is too low, the battery charge-discharge exhibits poor performance. If the amount of the conductive additive is too high, the capacity of the battery would be reduced. If the amount of the binder is too low, the positive electrode active layer would not be formed. If the amount of the binder is too high, a hard and brittle positive electrode active layer 24 would be formed.

According to embodiments of the disclosure, the conductive additive can be a conductive additive used in a positive electrode of a lithium battery, such as carbon black, conductive graphite, carbon nanotube, carbon fiber, or graphene. According to embodiments of the disclosure, the binder can include polyvinyl alcohol (PVA), polytetrafluoroethylene (PTFE), sodium carboxymethyl cellulose, polyvinylidene fluoride (PVDF), styrene-butadiene copolymer, fluorinated rubber, polyurethane, polyvinyl pyrrolidone, poly(ethyl acrylate), polyvinylchloride (PVC), polyacrylonitrile (PAN), polybutadiene, polyacrylic acid (PAA), or a combination thereof. The positive electrode active layer 24 can be directly disposed on the positive electrode current-collecting layer 22 due to the addition of the binder, thereby preventing the positive electrode active layer 24 from being peeled off from the positive electrode current-collecting layer 22.

According to embodiments of the disclosure, the binder used in the positive electrode can include polyvinyl alcohol (PVA), polytetrafluoroethylene (PTFE), sodium carboxymethyl cellulose, polyvinylidene fluoride (PVDF), styrene-butadiene copolymer, fluorinated rubber, polyurethane, polyvinyl pyrrolidone, poly(ethyl acrylate), polyvinylchloride (PVC), polyacrylonitrile (PAN), polybutadiene, polyacrylic acid (PAA), or a combination thereof.

According to embodiments of the disclosure, the positive electrode current-collecting layer 22 can include a metal foil, such as aluminum foil, carbon coated aluminum foil, stainless steel foil, or other metal foil (such as, platinum, titanium etc.).

According to embodiments of the disclosure, the method for preparing the positive electrode can include the following steps. First, the positive electrode material, the conductive additive, and the binder are dispersed in a solvent (such as N-methylpyrrolidone, N,N-dimethylformamide (DMF), N,N-dimethylacetamide (DMAc), pyrrolidone, N-dodecylpyrrolidone, γ-butyrolactone, or a combination thereof), obtaining a positive electrode slurry. The positive electrode slurry has a solid content from 40 wt % to 80 wt %. Next, a positive electrode current-collecting layer is provided. Next, the positive electrode slurry is coated on the surface of the positive electrode current-collecting layer by a coating process. The coating process can be screen printing, spin coating, bar coating, blade coating, roller coating, solvent casting, or dip coating. Next, the coating is subjected to a drying process (having a process temperature of 90-180° C.), obtaining the positive electrode active layer. Thus, the process for preparing the positive electrode of the disclosure is completed.

Figure 3:
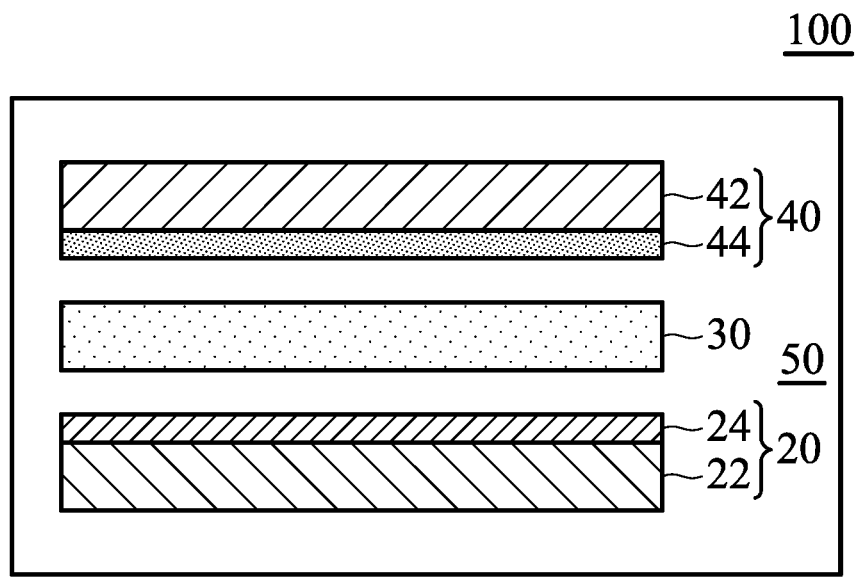
FIG. 3 is a schematic view of the battery according to an embodiment of the disclosure.

According to embodiments of the disclosure, as shown in FIG. 3, the disclosure also provides a battery 100, such as lithium-ion battery. The battery 100 includes the aforementioned positive electrode 20, a separator 30, and a negative electrode 40, wherein the negative electrode 40 is separated from the positive electrode 20 by the separator 30. According to embodiments of the disclosure, the battery 100 can further include an electrolyte liquid 50, and the electrolyte liquid is disposed between the positive electrode 20 and the negative electrode 40. The positive electrode, the separator and the negative electrode are stacked on each other and immersed in the electrolyte liquid 50. Namely, the battery 100 is filled with the electrolyte liquid. According to some embodiments of the disclosure, the positive electrode active layer 24 of the disclosure is disposed between the separator 50 and the positive electrode current-collecting layer 22.

According to embodiments of the disclosure, the battery 100 of the disclosure can consist of the positive electrode 20, the separator 30, the negative electrode 40, and the electrolyte liquid 50.

According to embodiments of the disclosure, the material of the separator 30 includes insulating material, such as polyethylene (PE), polypropylene (PP), polytetrafluoroethylene film, polyamide film, polyvinyl chloride film, poly (vinylidene fluoride) film, polyaniline film, polyimide film, non-woven fabric, polyethylene terephthalate, polystyrene (PS), cellulose, or a combination thereof. For example, the separator can be PE/PP/PE multilayer composite structure. According to embodiments of the disclosure, the separator can have a porous structure. Namely, the pores of the separator are uniformly distributed among the whole separator.

According to embodiments of the disclosure, the electrolyte liquid 50 can include a solvent and a lithium salt (or lithium-containing compound). According to embodiments of the disclosure, the solvent can be organic solvent, such as ester solvent, ketone solvent, carbonate solvent, ether solvent, alkane solvent, amide solvent, or a combination thereof. According to embodiments of the disclosure, the solvent can be 1,2-diethoxyethane, 1,2-dimethoxyethane, 1,2-dibutoxyethane, tetrahydrofuran, 2-methyl tetrahydrofuran, dimethylacetamide (DMAc), N-methyl-2-pyrrolidone (NMP), methyl acetate, ethyl acetate, methyl butyrate, ethyl butyrate, methyl propionate, ethyl propionate, propyl acetate (PA), γ-butyrolactone (GBL), ethylene carbonate (EC), propylene carbonate (PC), diethyl carbonate (DEC), ethylmethyl carbonate (EMC), dimethyl carbonate (DMC), vinylene carbonate, butylene carbonate, dipropyl carbonate, or a combination thereof. According to embodiments of the disclosure, the lithium salt (or lithium-containing compound) can be $LiPF_6$, $LiClO_4$, lithium bis(fluorosulfonyl) imide (LiFSI), lithium oxalyldifluoro borate (LiDFOB), $LiBF_4$, $LiSO_3CF_3$, $LiN(SO_2CF_3)_2$, $LiN(SO_2CF_2CF_3)_2$, $LiAsF_6$, $LiSbF_6$, $LiAlCl_4$, $LiGaCl_4$, $LiNO_3$, $LiC(SO_2CF_3)_3$, $LiSCN$, $LiO_3SCF_2CF_3$, $LiC_6F_5SO_3$, $LiO_2CCF_3$, $LiSO_3F$, $LiB(C_6H_5)_4$, $LiB(C_2O_4)_2$(LiBOB), $LiFePO_4$, $Li_7La_3Zr_2O_2$, $LiLaTi_2O_6$, $Li_{2.9}PO_{3.3}N_{0.46}$, $Li_3PO_4$, $Li_{1.3}Al_{0.3}Ti_{0.7}(PO_4)_3$, $Li_{3.6}Si_{0.6}P_{0.4}O_4$, $Li_5La_3Ta_2O_{12}$, or a combination thereof.

According to embodiments of the disclosure, the negative electrode 40 can include a negative electrode current-collecting layer 42, and a negative electrode active layer 44 disposed on the negative electrode current-collecting layer 42, wherein the negative electrode active layer 44 includes a negative electrode material. In some embodiments, the negative electrode active layer further comprising a binder, wherein the negative electrode material can have a weight percentage from about 98 wt % to 99.9 wt % (such as about 98.5 wt %, 99 wt %, or 99.5 wt %), and the binder can have a weight percentage from about 0.1 wt % to 2 wt % (such as about 0.2 wt %, 0.4 wt %, 0.6 wt %, 0.8 wt %, 1.0 wt %, 1.2 wt %, 1.4 wt %, 1.6 wt %, or 1.8 wt %), based on the total weight of the negative electrode material and the binder. According to embodiments of the disclosure, the binder used in the negative electrode can include polyvinyl alcohol (PVA), polytetrafluoroethylene (PTFE), sodium carboxymethyl cellulose, polyvinylidene fluoride (PVDF), styrene-butadiene copolymer, fluorinated rubber, polyurethane, polyvinyl pyrrolidone, poly(ethyl acrylate), polyvinylchloride (PVC), polyacrylonitrile (PAN), polybutadiene, polyacrylic acid (PAA), or a combination thereof. According to embodiments of the disclosure, the negative electrode current-collecting layer can be metal foil, such as copper foil, nickel foil, or aluminum foil.

According to some embodiments of the disclosure, the negative electrode active layer 44 is disposed between the separator 50 and the negative electrode current-collecting layer 42. According to embodiments of the disclosure, the negative electrode material includes carbon material, lithium, transition metal oxide, lithium-containing compound, silicon-containing compound, or a combination thereof. According to embodiments of the disclosure, the carbon material can include meso carbon micro bead (MCMB), vapor grown carbon fiber (VGCF), carbon nanotube (CNT), graphene, coke, graphite, carbon black, acetylene black, carbon fiber, or a combination thereof. According to embodiments of the disclosure, the lithium-containing compound can include LiAl, LiMg, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, or $Li_{2.6}Cu_{0.4}N$. According to embodiments of the disclosure, the silicon-containing compound can include silicon oxide, carbon-modified silicon oxide, silicon carbide, pure-silicon material, or a combination thereof. According to embodiments of the disclosure, the transition metal oxide can include $Li_4Ti_5O_2$, or $TiNb_2O_7$.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1

Polyaniline (PANI) (commercially available from Chanmol Biotech Co., Ltd. with a trade designation of CM-PAD9901) was dispersed or dissolved in N-methylpyrrolidone (NMP), obtaining a polyaniline solution, wherein the polyaniline solution had a solid content of 5 wt % (i.e. the weight ratio of the PANI to NMP was 5:95). Next, 3-aminopropyltriethoxysilane (ATPES) (serving as the coupling agent) was added into the polyaniline solution, wherein the weight ratio of ATPES to PANI was 1:100. Next, the obtained solution was stirred uniformly at 25° C. for 60 minutes, and then lithium aluminum titanium phosphate (LATP) (commercially available from NEI Corporation with a trade designation of Nanomyte® LATP) (wherein the molar ratio of Li/Al/Ti/$PO_4$ was 2/1/1/3) was added into the solution to obtain a mixture, wherein the 2:1. Next, the mixture was stirred at 70° C. for 180 minutes, obtaining Slurry (1).

Preparation Example 2

Maleimide (with a structure of

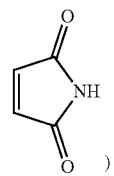
)

was dispersed or dissolved in N-methylpyrrolidone (NMP), obtaining a maleimide solution. The maleimide solution had a solid content of 5 wt % (i.e. the weight ratio of maleimide to NMP was 5:95). Next, 3-aminopropyltriethoxysilane (AT-PES) (serving as the coupling agent) was added into the maleimide solution, wherein the weight ratio of ATPES to maleimide was 0.2:100. Next, the obtained solution was stirred uniformly at 25° C. for 60 minutes, and then lithium aluminum titanium phosphate (LATP) (commercially available from NEI Corporation with a trade designation of Nanomyte® LATP) (wherein the molar ratio of Li/Al/Ti/PO$_4$ was 2/1/1/3) was added into the solution to obtain a mixture, wherein the weight ratio of LATP to maleimide was 3:2. Next, the mixture was stirred at 70° C. for 180 minutes, obtaining Slurry (2).

Preparation Example 3

Polyaniline (PANI) (commercially available from Chanmol Biotech Co., Ltd. with a trade designation of CM-PAD9901) (with a purity of 99.2%) was dispersed or dissolved in N-methylpyrrolidone (NMP), obtaining a polyaniline solution, wherein the polyaniline solution had a solid content of 5 wt % (i.e. the weight ratio of the PANI to NMP was 5:95). Next, 3-aminopropyltriethoxysilane (ATPES) (serving as the coupling agent) was added into the polyaniline solution, wherein the weight ratio of ATPES to PANI was 2:100. Next, the obtained solution was stirred uniformly at 25° C. for 60 minutes, and then lithium aluminum titanium phosphate (LATP) (commercially available from NEI Corporation with a trade designation of Nanomyte® LATP) (wherein the molar ratio of Li/Al/Ti/PO$_4$ was 2/1/1/3) was added into the solution to obtain a mixture, wherein the weight ratio of LATP to PANI was 4:1. Next, the mixture was stirred at 70° C. for 180 minutes, obtaining Slurry (3).

Preparation Example 4

Maleimide (with a structure of

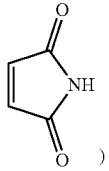

)

was dispersed or dissolved in N-methylpyrrolidone (NMP), obtaining a maleimide solution. The maleimide solution had a solid content of 5 wt % (i.e. the weight ratio of maleimide to NMP was 5:95). Next, 3-mercaptopropyltrimethoxysilane (MPTMS) (serving as coupling agent) was added into the maleimide solution, wherein the weight ratio of MPTMS to maleimide was 0.2:100. Next, the obtained solution was stirred uniformly at 25° C. for 60 minutes, and then lithium aluminum titanium phosphate (LATP) (commercially available from NEI Corporation with a trade designation of Nanomyte® LATP) (wherein the molar ratio of Li/Al/Ti/PO$_4$ was 2/1/1/3) was added into the solution to obtain a mixture, wherein the weight ratio of LATP to maleimide was 3:2. Next, the mixture was stirred at 70° C. for 180 minutes, obtaining Slurry (4).

Preparation Example 5

Polypyrrole (PPy) (commercially available from Sigma-Aldrich with a trade designation of 577030) was dispersed or dissolved in N-methylpyrrolidone (NMP), obtaining a polypyrrole solution, wherein the polypyrrole solution had a solid content of 5 wt % (i.e. the weight ratio of PPy to NMP was 5:95). Next, 3-aminopropyltriethoxysilane (ATPES) (serving as coupling agent) was added into the polypyrrole solution, wherein the weight ratio of ATPES to PPy was 1:100. Next, the obtained solution was stirred uniformly at 25° C. for 60 minutes, and then lithium aluminum titanium phosphate (LATP) (commercially available from NEI Corporation with a trade designation of Nanomyte® LATP) (wherein the molar ratio of Li/Al/Ti/PO$_4$ was 2/1/1/3) was added into the solution to obtain a mixture, wherein the weight ratio of LATP to PPy was 3:2. Next, the mixture was stirred at 100° C. for 150 minutes, obtaining Slurry (5).

Preparation Example 6

Maleimide (with a structure of

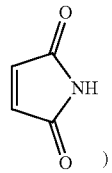

)

and polyaniline (PANI) (commercially available from Chanmol Biotech Co., Ltd. with a trade designation of CM-PAD9901) was dispersed or dissolved in N-methylpyrrolidone (NMP), obtaining a solution, wherein the weight ratio of polyaniline to maleimide was 1:4. The solution had a solid content of 5 wt % (i.e. the ratio of the total weight of maleimide and polyaniline to the weight of NMP was 5:95). Next, 3-aminopropyltriethoxysilane (ATPES) (serving as coupling agent) was added into the solution, wherein the ratio of the weight of APTES to the total weight of maleimide and polyaniline was 0.1:100. Next, the obtained solution was stirred at 90° C. for 60 minutes, and then lithium aluminum titanium phosphate (LATP) (commercially available from NEI Corporation with a trade designation of Nanomyte® LATP) (wherein the molar ratio of Li/Al/Ti/PO$_4$ was 2/1/1/3) was added into the solution to obtain a mixture, wherein the ratio of the weight of LATP to the total weight of maleimide and polyaniline was 1:1. Next, the mixture was stirred at 70° C. for 180 minutes, obtaining Slurry (6).

The starting materials and amounts of Slurry (1)-(6) was shown in Table

TABLE 1

| | organic conductive compound | ionic conductive ceramic compound | coupling agent | coupling agent (wt %) (based on the total weight of the ionic conductive ceramic compound and the organic conductive compound) | weight ratio of ionic conductive ceramic compound to organic conductive compound |
|---|---|---|---|---|---|
| Slurry (1) | PANI | LATP | ATPES | 0.33 | 2:1 |
| Slurry (2) | maleimide | LATP | ATPES | 0.08 | 3:2 |

TABLE 1-continued

|  | organic conductive compound | ionic conductive ceramic compound | coupling agent | coupling agent (wt %) (based on the total weight of the ionic conductive ceramic compound and the organic conductive compound) | weight ratio of ionic conductive ceramic compound to organic conductive compound |
|---|---|---|---|---|---|
| Slurry (3) | PANI | LATP | ATPES | 0.4 | 4:1 |
| Slurry (4) | maleimide | LATP | MPTMS | 0.08 | 3:2 |
| Slurry (5) | PPy | LATP | ATPES | 0.4 | 3:2 |
| Slurry (6) | PANI/maleimide (1:4) | LATP | ATPES | 0.05 | 1:1 |

Example 1

Slurry (1) of Preparation Example 1 (having a solid amount of 1 part by weight) and 96.83 parts by weight lithium nickel cobalt manganese oxide (LiNi$_i$Mn$_j$Co$_k$O$_2$, i: 0.83-0.85; j: 0.4-0.5; and, k: 0.11-0.12) (commercially available from Ningbo Ronbay New Energy Technology Co., Ltd. with a trade designation of NMC811-S85E) were mixed, and stirred at 60° C. for 120 minutes, obtaining modified lithium nickel cobalt manganese oxide (with a solid amount of 97.83 parts by weight). Next, 0.99 parts by weight of conductive carbon (commercially available from TimCal Co. with a trade designation of super-p), carbon nanotube solution (carbon nanotube dissolved in NMP) (having a solid content of 2.2% and a solid amount of 0.3 parts by weight), and 1.39 parts by weight of binder (commercially available from Solvay S.A. with a trade designation of PVDF5130) were mixed with the modified lithium nickel cobalt manganese oxide. After stirring uniformly, a lithium-ion battery positive electrode slurry was obtained.

Next, the lithium-ion battery positive electrode slurry was coated on an aluminum foil (serving as positive electrode current-collecting layer) (commercially available from An Chuan Enterprise Co., Ltd., with a thickness of 12 μm). After drying, a positive electrode with a positive electrode active layer was obtained. Next, a negative electrode (wherein the negative electrode active layer was SiO/C (silicon oxide and carbon mixture) (commercially available from Kaijin New Energy Technology Co., Ltd. with a trade designation of KYX-2), and the negative electrode current-collecting layer was copper foil (commercially available from Chang Chun Group with a trade designation of BFR-F) and a separator (commercially available from Asahi Kasei with a trade designation of Celgard 2320). Next, the negative electrode, the separator and the positive electrode were placed in sequence and sealed within a jelly roll (with a size of 65 mm (high)×55 mm (width)×65 mm (length)). An electrolyte liquid (including LiPF$_6$ salt and solvent, wherein the solvent included ethylene carbonate (EC) and diethyl carbonate (DEC) (the volume ratio of EC to DEC was 1:1), and the concentration of LiPF$_6$ was 1.1M) was injected into the jelly roll, obtaining a battery. Next, a test of the battery was performed, and the results are shown in Table 2.

Example 2

Example 2 was performed in the same manner as Example 1, except that Slurry (1) of Preparation Example 1 was replaced with Slurry (2) of Preparation Example 2, obtaining a battery. Next, a test of the battery was performed, and the results are shown in Table 2.

Example 3

Example 3 was performed in the same manner as Example 1, except that Slurry (1) of Preparation Example 1 was replaced with Slurry (3) of Preparation Example 3 and the solid amount of the slutty was increased from 1 part by weight to 1.5 parts by weight, obtaining a battery. Next, a test of the battery was performed, and the results are shown in Table 2.

Example 4

Example 4 was performed in the same manner as Example 1, except that Slurry (1) of Preparation Example 1 was replaced with Slurry (4) of Preparation Example 4, obtaining a battery. Next, a test of the battery was performed, and the results are shown in Table 2.

Example 5

Example 5 was performed in the same manner as Example 1, except that Slurry (1) of Preparation Example 1 was replaced with Slurry (5) of Preparation Example 5, obtaining a battery. Next, a test of the battery was performed, and the results are shown in Table 2.

TABLE 2

|  | Example 1 | Example 2 | Example 3 | Example 4 | Example 5 |
|---|---|---|---|---|---|
| electrode sheet resistance (mΩ) | 93.4 | 102.5 | 130.0 | 114.9 | 96.8 |
| electrode adhesion (gf) | 485.7 | 558.0 | 498.2 | 412.5 | 428.9 |
| battery resistance (mΩ) | 30 | 31 | 36 | 34 | 32 |
| 1$^{st}$ discharge capacity (mAh) | 5585 | 5459.4 | 5119.6 | 5173 | 5242.5 |
| discharging at 0.2 C (%) | 100% | 100% | 100% | 100% | 100% |
| discharging at 0.5 C (%) | 96.9% | 94.5% | 95.0% | 95.8% | 93.8% |
| discharging at 1 C (%) | 94.0% | 92.3% | 92.1% | 93.5% | 89.5% |
| discharging at 2 C (%) | 90.1% | 90.6% | 93.5% | 88.1% | 85.5% |
| discharging at 3 C (%) | 82.3% | 87.2% | 81.4% | 85.5% | 80.2% |
| Exothermal heat amount (J/g) | 553 | 729 | 689 | 824 | 890 |

Herein, the positive electrode sheet resistance was measured by a four-point probe resistivity measurement; the electrode adhesion was measured by a tensile testing machine; the battery resistance was measured by a battery internal resistance measurement; the discharge capacity and the discharge percentage were measured by a battery charge/discharge system; and, the exothermal heat amount of the battery was measured by a differential scanning calorimeter.

Example 6

Example 6 was performed in the same manner as Example 1, except that Slurry (1) of Preparation Example 1 was replaced with Slurry (6) of Preparation Example 6, obtaining a battery. Next, a test of the battery was performed, and the results are shown in Table 3.

Example 7

Example 7 was performed in the same manner as Example 1, except that the solid amount of Slurry (1) was increased from 1 part by weight to 5 parts by weight, obtaining a battery. Next, a test of the battery was performed, and the results are shown in Table 3.

Example 8

Example 8 was performed in the same manner as Example 3, except that the solid amount of Slurry (3) was reduced from 1 part by weight to 0.5 parts by weight, obtaining a battery. Next, a test of the battery was performed, and the results are shown in Table 3.

Example 9

Example 9 was performed in the same manner as Example 6, except that the solid amount of Slurry (6) was increased from 1 part by weight to 5 parts by weight, obtaining a battery. Next, a test of the battery was performed, and the results are shown in Table 3.

TABLE 3

| | Example 6 | Example 7 | Example 8 | Example 9 |
|---|---|---|---|---|
| electrode sheet resistance (mΩ) | 108.5 | 101.1 | 99.5 | 130.0 |
| electrode adhesion (gf) | 392.9 | 428.5 | 458.5 | 382.5 |

Comparative Example 1

A standard lithium-ion battery positive electrode slurry (including 97.3% of NMC811 ($LiNi_iMn_jCo_kO_2$, i: 0.83-0.85; j: 0.4-0.5; and, k: 0.11-0.12) (commercially available from Ningbo Ronbay New Energy Technology Co., Ltd. with a trade designation of NMC811-S85E), 1% of Super-P (conductive carbon powder) (commercially available from TimCal Co.), and 1.4% of PVDF-5130, 0.3% of carbon nanotube (with a trade designation of TUBALL™ BATT NMP 0.4% PVDF SOLVAY SOLEF® 5130, commercially available from OCSiAl)) was coated on an aluminum foil (serving as positive electrode current-collecting layer) (commercially available from An Chuan Enterprise Co., Ltd., with a thickness of 12 μm). After drying, a positive electrode with a positive electrode active layer was obtained. Next, a negative electrode was provided, wherein the negative electrode active layer was SiO/C (commercially available from Kaijin New Energy Technology Co., Ltd. with a trade designation of KYX-2), and the negative electrode current-collecting layer was copper foil (commercially available from Chang Chun Group with a trade designation of BFR-F). A separator (available under the trade designation of Celgard 2320) was provided. Next, the negative electrode, the separator and the positive electrode were placed in sequence and sealed within a jelly roll (with a size of 65 mm (high)×55 mm (width)×65 mm (length)). An electrolyte liquid (including $LiPF_6$ and solvent, wherein the solvent included ethylene carbonate (EC) and diethyl carbonate (DEC) (the volume ratio of EC to DEC was 1:1), and the concentration of $LiPF_6$ was 1.1M) was injected into the jelly roll, obtaining a battery. Next, a test of the battery was performed, and the results are shown in Table 4.

Comparative Example 2

A standard lithium-ion battery positive electrode slurry (including 97.3% of NMC811 ($LiNi_iMn_jCo_kO_2$, i: 0.83-0.85; j: 0.4-0.5; and, k: 0.11-0.12) (commercially available from Ningbo Ronbay New Energy Technology Co., Ltd. with a trade designation of NMC811-S85E), 1% of Super-P (conductive carbon powder) (commercially available from TimCal Co.), 1.4% of PVDF-5130, and 0.3% of carbon nanotube (with a trade designation of TUBALL™ BATT NMP 0.4% PVDF SOLVAY SOLEF® 5130, commercially available from OCSiAl)) was coated on an aluminum foil (serving as positive electrode current-collecting layer) (commercially available from An Chuan Enterprise Co., Ltd., with a thickness of 12 μm). After drying, a positive electrode with a positive electrode active layer was obtained. Next, a negative electrode was provided, wherein the negative electrode active layer was SiO/C (commercially available from Kaijin New Energy Technology Co., Ltd. with a trade designation of KYX-2), and a negative electrode current-collecting layer was copper foil (commercially available from Chang Chun Group with a trade designation of BFR-F). A separator (available under the trade designation of Celgard 2320) was provided. Next, the negative electrode, the separator and the positive electrode were placed in sequence and sealed within a jelly roll (with a size of 65 mm (high)×55 mm (width)×65 mm (length)). An electrolyte liquid (including $LiPF_6$ and solvent, wherein the solvent included ethylene carbonate (EC) and diethyl carbonate (DEC) (the volume ratio of EC to DEC was 1:1), and the concentration of $LiPF_6$ was 1.1M) was injected into the jelly roll. Next, a test of the battery was performed, and the results are shown in Table 4.

Comparative Example 3

A standard lithium-ion battery positive electrode slurry (including 97.3% of NMC811 ($LiNi_iMn_jCo_kO_2$, i: 0.83-0.85; j: 0.4-0.5; and, k: 0.11-0.12) (commercially available from Ningbo Ronbay New Energy Technology Co., Ltd. with a trade designation of NMC811-S85E), 1% of Super-P (conductive carbon powder) (commercially available from TimCal Co.), 1.4% of PVDF-5130, and 0.3% of carbon nanotube (with a trade designation of TUBALL™ BATT NMP 0.4% PVDF SOLVAY SOLEF® 5130, commercially available from OCSiAl)) was coated on an aluminum foil (serving as positive electrode current-collecting layer) (commercially available from An Chuan Enterprise Co., Ltd., with a thickness of 12 μm). After drying, a positive electrode with a positive electrode active layer was obtained. Next, a negative electrode was provided, wherein the negative electrode active layer was SiO/C (commercially available from Kaijin New Energy Technology Co., Ltd. with a trade designation of KYX-2), and a negative electrode current-collecting layer was copper foil (commercially available from Chang Chun Group with a trade designation of BFR-F). A separator (available under the trade designation of Celgard 2320) was provided. Next, the negative electrode, the separator and the positive electrode were placed in sequence and sealed within a jelly roll (with a size of 65 mm (high)×55 mm (width)×65 mm (length)). An electrolyte liquid (including $LiPF_6$ and solvent, wherein the solvent included ethylene carbonate (EC) and diethyl carbonate (DEC) (the volume ratio of EC to DEC was 1:1), and the concentration of $LiPF_6$ was 1.1M) was injected into the jelly roll. Next, a test of the battery was performed, and the results are shown in Table 4.

Comparative Example 4

A standard lithium-ion battery positive electrode slurry (including 97.3% of NMC811 ($LiNi_iMn_jCo_kO_2$, i: 0.83-0.85; j: 0.4-0.5; and, k: 0.11-0.12) (commercially available from Ningbo Ronbay New Energy Technology Co., Ltd. with a trade designation of NMC811-S85E), 1% of Super-P (conductive carbon powder) (commercially available from TimCal Co.), 1.4% of PVDF-5130, and 0.3% of carbon nanotube (with a trade designation of TUBALL™ BATT NMP 0.4% PVDF SOLVAY SOLEF® 5130, commercially available from OCSiAl)) was coated on an aluminum foil (serving as positive electrode current-collecting layer) (commercially available from An Chuan Enterprise Co., Ltd., with a thickness of 12 μm). After drying, a positive electrode with a positive electrode active layer was obtained. Next, a negative electrode was provided, wherein the negative electrode active layer was SiO/C (commercially available from Kaijin New Energy Technology Co., Ltd. with a trade designation of KYX-2), and a negative electrode current-collecting layer was copper foil (commercially available from Chang Chun Group with a trade designation of BFR-F). A separator (available under the trade designation of Celgard 2320) was provided. Next, the negative electrode, the separator and the positive electrode were placed in sequence and sealed within a jelly roll (with a size of 65 mm (high)×55 mm (width)×65 mm (length)). An electrolyte liquid (including $LiPF_6$ and solvent, wherein the solvent included ethylene carbonate (EC) and diethyl carbonate (DEC) (the volume ratio of EC to DEC was 1:1), and the concentration of $LiPF_6$ was 1.1M) was injected into the jelly roll. Next, a test of the battery was performed, and the results are shown in Table 4.

Comparative Example 5

A standard lithium-ion battery positive electrode slurry (including 97.3% of NMC811 ($LiNi_iMn_jCo_kO_2$, i: 0.83-0.85; j: 0.4-0.5; and, k: 0.11-0.12) (commercially available from Ningbo Ronbay New Energy Technology Co., Ltd. with a trade designation of NMC811-S85E), 1% of Super-P (conductive carbon powder) (commercially available from TimCal Co.), 1.4% of PVDF-5130, and 0.3% of carbon nanotube (with a trade designation of TUBALL™ BATT NMP 0.4% PVDF SOLVAY SOLEF® 5130, commercially available from OCSiAl)) was coated on an aluminum foil (serving as positive electrode current-collecting layer) (commercially available from An Chuan Enterprise Co., Ltd., with a thickness of 12 μm). After drying, a positive electrode with a positive electrode active layer was obtained. Next, a negative electrode was provided, wherein the negative electrode active layer was SiO/C (commercially available from Kaijin New Energy Technology Co., Ltd. with a trade designation of KYX-2), and a negative electrode current-collecting layer was copper foil (commercially available from Chang Chun Group with a trade designation of BFR-F). A separator (available under the trade designation of Celgard 2320) was provided. Next, the negative electrode, the separator and the positive electrode were placed in sequence and sealed within a jelly roll (with a size of 65 mm (high) 55 mm (width)×65 mm (length)). An electrolyte liquid (including $LiPF_6$ and solvent, wherein the solvent included ethylene carbonate (EC) and diethyl carbonate (DEC) (the volume ratio of EC to DEC was 1:1), and the concentration of $LiPF_6$ was 1.1M) was injected into the jelly roll. Next, a test of the battery was performed, and the results are shown in Table 4.

TABLE 4

|  | Comparative Example 1 | Comparative Example 2 | Comparative Example 3 | Comparative Example 4 | Comparative Example 5 |
| --- | --- | --- | --- | --- | --- |
| electrode sheet resistance (mΩ) | 141.0 | 139.2 | 133.9 | 176.5 | 208.3 |
| electrode adhesion (gf) | 320.5 | 303.7 | 272.9 | 293.5 | 274.0 |
| battery resistance (mΩ) | 4 | 36 | 40 | 47 | — |
| $1^{st}$ discharge capacity (mAh) | 5087 | 5114 | 5103 | 5000 | — |
| discharging at 0.2 C (%) | 100% | 100% | 100% | 100% | — |
| discharging at 0.5 C (%) | 92.3% | 95.0% | 94.5% | 92.1% | — |
| discharging at 1 C (%) | 89.2% | 91.5% | 90.8% | 90.5% | — |
| discharging at 2 C (%) | 80.1% | 80.2% | 82.5% | 82.2% | — |
| discharging at 3 C (%) | 72.3% | 77.0% | 75.0% | 76.1% | — |
| Exothermal heat amount (J/g) | 1330.5 | 990.2 | 965.8 | 1121.2 | — |

As shown in Tables 2-4, when the positive electrode of the lithium-ion battery is prepared by the positive electrode material of the disclosure, the sheet resistance of the lithium-ion battery positive electrode and the electrode adhesion can be improved. Furthermore, the resistance and exothermal heat amount of the battery are reduced, and the high-rate discharge ability is improved.

It will be clear that various modifications and variations can be made to the disclosed methods and materials. It is intended that the specification and examples be considered as exemplary only, with the true scope of the disclosure being indicated by the following claims and their equivalents.

What is claimed is:
1. A positive electrode material, comprising:
   an active particle; and
   a modified layer covering the surface of the active particle, wherein the modified layer is a reaction product of a composition, wherein the composition comprises:
   50 to 84 parts by weight of ionic conductive ceramic compound;

16 to 50 parts by weight of organic conductive compound, wherein the total weight of the ionic conductive ceramic compound and the organic conductive compound is 100 parts by weight; and 0.05 wt % to 10 wt % of coupling agent, based on the total weight of the ionic conductive ceramic compound and the organic conductive compound.

2. The positive electrode material as claimed in claim 1, wherein the ionic conductive ceramic compound is a doped or undoped titanium-containing phosphate, wherein the titanium-containing phosphate has a structure of Formula (I):

$$Li_xM_yTi_z(PO_4)_t$$ Formula (I)

wherein M is Al, Fe, or Cr; $0.15 \leq x \leq 53$; $0.1 \leq y \leq 3$; $1 \leq z \leq 3$; and, $1 \leq t \leq 3$.

3. The positive electrode material as claimed in claim 2, when the ionic conductive ceramic compound is the doped titanium-containing phosphate and M is Al or Fe, the doped element is Cr, Zr, Sn, Ge, S, or a combination thereof.

4. The positive electrode material as claimed in claim 2, when the ionic conductive ceramic compound is the doped titanium-containing phosphate and M is Cr, the doped element is Zr, Sn, Ge, S, or a combination thereof.

5. The positive electrode material as claimed in claim 2, wherein the titanium-containing phosphate is lithium aluminum titanium phosphate, lithium iron titanium phosphate, or lithium chromium titanium phosphate.

6. The positive electrode material as claimed in claim 1, wherein the organic conductive compound is a compound having an aniline moiety, pyrrole moiety, maleimide moiety, or imino moiety.

7. The positive electrode material as claimed in claim 1, wherein the organic conductive compound is polyaniline, polyacetylene, polyphenylvinylene, poly-p-phenylene, polypyrrole, polythiophene, polyimide, maleimide compound, or a combination thereof.

8. The positive electrode material as claimed in claim 1, wherein the coupling agent comprises at least one of compounds having a structure of Formula (VI)

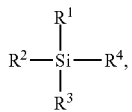

Formula (VI)

wherein $R^1$, $R^2$, $R^3$ and $R^4$ are independently —OH, —OC$_n$H$_{2n+1}$, —C$_n$H$_{2n}$NH$_2$, —C$_n$H$_{2n}$SH, or —C$_n$H$_{2n}$OCOCHCHR$^5$; at least one of $R^1$, $R^2$, $R^3$ and $R^4$ is —C$_n$H$_{2n}$NH$_2$, —C$_n$H$_{2n}$SH, —C$_n$H$_{2n}$NCO, —C$_n$H$_{2n}$NHCONH$_2$, or —C$_n$H$_{2n}$OCOCHCHR$^5$; n is independently an integer from 1 to 5; and, $R^5$ is independently hydrogen or methyl group.

9. The positive electrode material as claimed in claim 8, wherein the coupling agent is a compound having a structure of Formula (VI), and the coupling agent is 3-methacryloxypropyl trimethoxysilane, 3-methacryloxypropyl triethoxysilane, 3-aminopropyltrimethoxysilane, 3-aminopropyltriethoxysilane (ATPES), 3-mercaptopropyltrimethoxysilane (MPTMS), 3-mercaptopropyltriethoxysilane, 3-acryloxypropyl trimethoxysilane, 3-acryloxypropyl triethoxysilane, 3-Ureidopropyltriethoxysilane, 3-Isocyanatepropyltriethoxysilane, or a combination thereof.

10. The positive electrode material as claimed in claim 1, wherein the active particle is lithium-containing oxide, and the lithium-containing oxide is lithium nickel cobalt aluminum oxide (NCA), lithium nickel cobalt manganese oxide (LNCM), lithium cobalt oxide, lithium manganese oxide, lithium nickel oxide, or a combination thereof.

11. The positive electrode material as claimed in claim 1, wherein the ratio of the weight of the modified layer to the total weight of the positive electrode material is from 0.001 to 0.1.

12. The positive electrode material as claimed in claim 1, wherein the modified layer comprises a network structure constituted by the organic conductive compound.

13. A positive electrode, comprising:
a positive electrode current-collecting layer; and
a positive electrode active layer disposed on the positive electrode current-collecting layer, wherein the positive electrode active layer comprises the positive electrode material as claimed in claim 1, a conductive additive, and a binder.

14. The positive electrode as claimed in claim 13, wherein the conductive additive comprises carbon black, conductive graphite, carbon nanotube, carbon fiber, or graphene.

15. The positive electrode as claimed in claim 13, in the positive electrode active layer, wherein the positive electrode material has a weight percentage from 96 wt % to 99.8 wt %, the conductive additive has a weight percentage from 0.1 wt % to 2 wt %, and the binder has a weight percentage from 0.1 wt % to 2 wt %, based on the total weight of the positive electrode material, the conductive additive, and the binder.

16. A battery, comprising:
the positive electrode as claimed in claim 13;
a separator; and
a negative electrode, wherein the negative electrode is separated from the positive electrode by a separator.

17. The battery as claimed in claim 16, further comprising:
an electrolyte liquid disposed between the positive electrode and the negative electrode.

18. The battery as claimed in claim 16, wherein the negative electrode comprises a negative electrode current-collecting layer; and a negative electrode active layer disposed on the negative electrode current-collecting layer, wherein the negative electrode active layer comprises a negative electrode material.

19. The battery as claimed in claim 16, wherein the negative electrode material comprises carbon material, lithium, transition metal oxide, lithium-containing compound, allyl material, silicon-containing compound, or a combination thereof.

* * * * *